(12) United States Patent
Joki

(10) Patent No.: US 7,980,371 B2
(45) Date of Patent: *Jul. 19, 2011

(54) SELECTABLE MODE CLUTCH

(75) Inventor: Mark A. Joki, Dover, OH (US)

(73) Assignee: Koyo Bearings USA LLC, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,989

(22) Filed: Aug. 23, 2010

(65) Prior Publication Data

US 2010/0314213 A1    Dec. 16, 2010

Related U.S. Application Data

(63) Continuation of application No. 11/718,534, filed as application No. PCT/US2005/039831 on Nov. 3, 2005, now Pat. No. 7,779,978.

(60) Provisional application No. 60/625,217, filed on Nov. 5, 2004.

(51) Int. Cl.
*F16D 27/102* (2006.01)
*F16D 15/00* (2006.01)

(52) U.S. Cl. ............... 192/35; 192/38; 192/84.8

(58) Field of Classification Search ............ 192/84.8
See application file for complete search history.

(56) References Cited

U.S. PATENT DOCUMENTS

| | | |
|---|---|---|
| 1,899,834 A | 2/1933 | Thomas et al. |
| 3,746,136 A | 7/1973 | Marola et al. |
| 5,005,683 A | 4/1991 | Ritter et al. |
| 5,732,807 A | 3/1998 | Itoh et al. |
| 5,971,123 A | 10/1999 | Ochab et al. |
| 6,123,183 A | 9/2000 | Ito et al. |
| 6,409,001 B1 | 6/2002 | Kerr |
| 6,427,547 B1 | 8/2002 | Bowen |
| RE38,012 E | 3/2003 | Ochab et al. |
| 6,579,205 B2 | 6/2003 | Williams |
| 6,602,159 B1 | 8/2003 | Williams |
| 6,612,957 B2 | 9/2003 | Bansbach et al. |
| 6,629,474 B2 | 10/2003 | Williams |
| 6,652,407 B2 | 11/2003 | Ronk et al. |
| 6,862,953 B2 | 3/2005 | Fitzgerald et al. |
| 7,004,875 B2 * | 2/2006 | Williams et al. ............ 475/198 |
| 7,037,200 B2 | 5/2006 | Dorrie et al. |
| 7,526,042 B2 | 4/2009 | Yoshida |
| 7,779,978 B2 * | 8/2010 | Joki ........................ 192/35 |
| 2008/0128233 A1 * | 6/2008 | Joki et al. ................. 192/45.1 |

FOREIGN PATENT DOCUMENTS

| | | |
|---|---|---|
| DE | 10158608 | 6/2003 |
| EP | 1253041 | 10/2002 |
| EP | 1253342 | 10/2002 |
| FR | 525070 | 9/1921 |

(Continued)

*Primary Examiner* — Richard M. Lorence
(74) *Attorney, Agent, or Firm* — Nelson Mullins Riley & Scarborough, LLP

(57) ABSTRACT

A clutching device includes an outer race, an inner race, a plurality of rollers and an actuator plate. The outer and inner races have axial ridges to define opposed outer and inner race pockets. The rollers are positioned in the outer and inner race pockets. The clutching device further includes an axial projection coupled for rotation with one of the inner and outer race. An actuator plate is coupled for rotation with one of the inner and outer race and axially moveable between a first position wherein the actuator plate engages the axial projection and a second position wherein the actuator plate does not engage the axial projection.

10 Claims, 3 Drawing Sheets

FOREIGN PATENT DOCUMENTS

| | | |
|---|---|---|
| GB | 583693 | 12/1946 |
| WO | 2005042998 | 5/2005 |
| WO | 2005068867 | 7/2005 |
| WO | 2005083288 | 9/2005 |
| WO | 2005106273 | 11/2005 |
| WO | 2005106276 | 11/2005 |

* cited by examiner

SELECTABLE MODE CLUTCH

CLAIM OF PRIORITY

This application is a continuation of U.S. patent application Ser. No. 11/718,534, filed May 3, 2007, now U.S. Pat No. 7,779,978, which is a 371 Application of PCT/US2005/039831, filed Nov. 3, 2005, which claims priority to U.S. Provisional Application Ser. No. 60/625,217, filed Nov. 5, 2004, the entire disclosure of which is incorporated by reference herein.

BACKGROUND

The present invention relates to clutches. More particularly, the present invention relates to a slipper clutch and means for selectively actuating the slipper clutch.

A slipper clutch can replace a parallel combination of a one-way clutch and mode selecting plate clutch assembly in an automatic transmission, eliminating the frictional drag of the plate clutch. Mode control of such a clutch in the prior art has employed radial features on the clutch races engaging with slots in a cylindrical control element. Supporting the cylindrical control element requires additional parts being used or results in difficult assembly, since the control element requires a supporting diameter that is greater than the shaft diameter.

SUMMARY

The present invention provides a clutching device comprising an outer race, an inner race, a plurality of rollers and an actuator plate. The outer race has a radially inward surface having a plurality of axial ridges to define outer race pockets and the inner race has a radially outward surface having a plurality of axial ridges to define inner race pockets opposed to the outer race pockets. The rollers are positioned between the outer and inner races in the outer and inner race pockets. The clutching device further includes an axial projection coupled for rotation with one of the inner and outer race. An actuator plate is coupled for rotation with one of the inner and outer race and axially moveable between a first position wherein the actuator plate engages the axial projection and a second position wherein the actuator plate does not engage the axial projection. The present invention allows for radial support of the control element at smaller diameters and minimizes the space required for actuation.

In one embodiment, the outer race includes an outer race axial tab having a first axial length and the inner race includes an inner race axial tab having a second axial length different from the first axial length. The actuator plate is axially moveable between a first position wherein the actuator plate engages both the outer and inner axial tabs and a second position wherein the actuator plate engages only one of the outer and inner axial tabs.

DETAILED DESCRIPTION

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
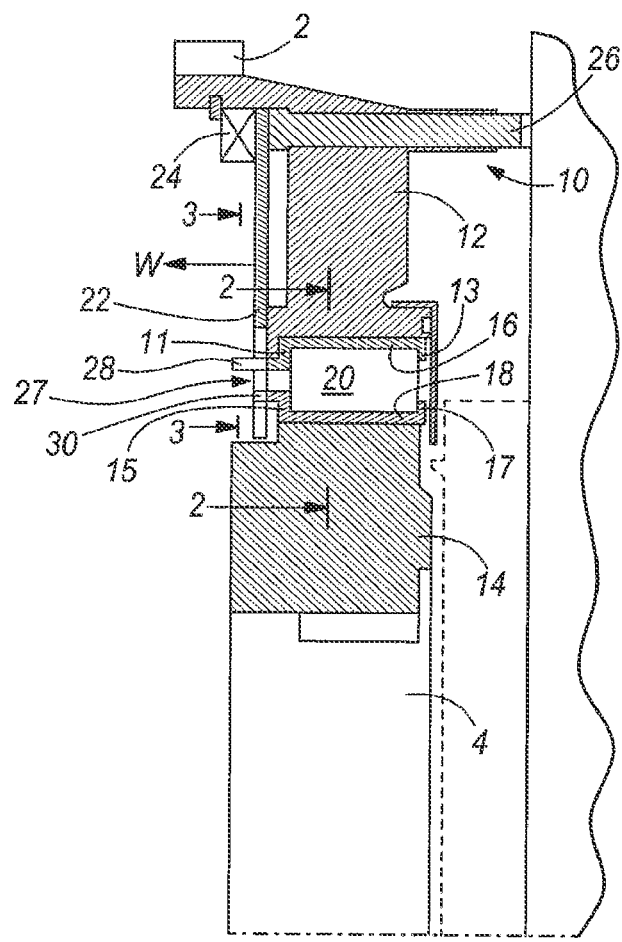
FIG. 1 is a sectional view of a clutching assembly that is a first embodiment of the present invention.
Figure 2:
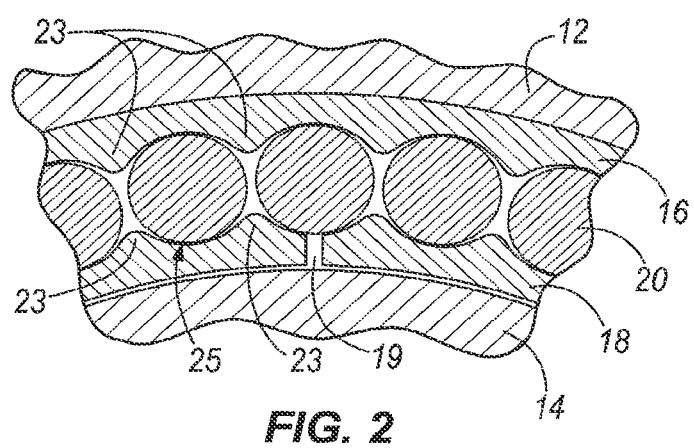
FIG. 2 is a sectional view taken along the line 2-2 in FIG. 1.
Figure 3:
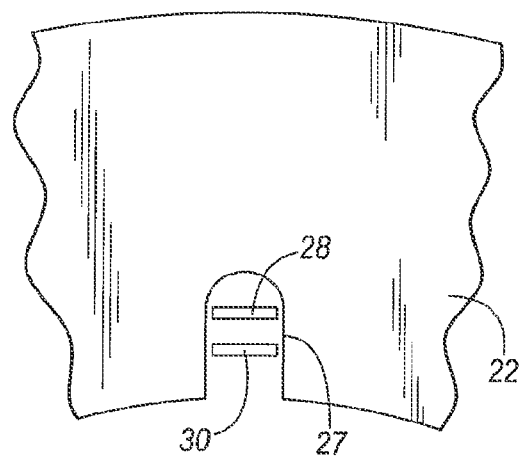
FIG. 3 is an elevation view of the actuator plate and inner and outer race tabs along the line 3-3 in FIG. 1.

Referring to FIGS. 1-3, a selectable mode clutch 10 that is a first embodiment of the present invention is shown. The clutch 10 generally comprises an outer ring 12, an inner ring 14, an outer race 16, an inner race 18, rollers 20, an actuator plate 22, a spring 24, and actuator pins 26. The outer race 16 is press fit into the outer ring 12, which is fixed to a non-rotating housing via a spline 2. The inner race 18 is slip fit to the inner ring 14 and is cut axially to make it a non-continuous ring, as indicated at 19 in FIG. 2. Alternatively, the inner race 18 can be interference fitted to the inner ring 14 to provide a small amount of drag to allow the clutch to engage. A shaft 4 is rotationally fixed to the inner ring 14. Both the inner and outer race 18, 16 have axial ridges 23 that form pockets 25 into which rollers 20 are placed. The side faces of these ridges 23 can contact the roller 20 at angles that tend to wedge the roller 20 against these faces. Both the outer and inner races 16, 18 have shoulders 11, 13 and 15, 17, respectively, at each end of the rollers 20 to contain the rollers 20 axially.

Both the outer and inner races 16, 18 have projections or tabs 28, 30 extending axially away from the rollers 20. One of the tabs 28 has an axial length greater than the other tab 30. While the illustrated embodiment shows the outer race tab 28 having a greater length, it is also contemplated that the inner race tab 30 could have the greater length. Referring to FIG. 3, the actuator plate 22 has a radial slot 27 configured to receive the tabs 28, 30. The actuator plate 22 is axially moveable between a first position, as shown in FIG. 1, and a second position in which the actuator plate 22 moves in the direction of arrow W in FIG. 1. In the first position, both tabs 28, 30 are within the actuator plate slot 22 and are engaged by the actuator plate 22. The actuator plate 22 maintains the outer and inner races 16, 18 in rotational alignment such that the pockets 25 remain rotationally aligned, thereby preventing wedging of the rollers 20 as friction of the inner ring 14 rotating against the inner race 18 creates a torque on the inner race 18. The actuator plate 22 is preferably maintained in the first position by the force of the spring 24. While a spring 24 is described, other biasing means, for example, a resilient ring may also be utilized.

When an external force is applied to the actuator pins 26, the actuator plate 22 moves in the direction of arrow W to the second position, compressing the spring 24. Since the inner race tab 30 is shorter than the outer race tab 28, the actuator plate 22 disengages the inner race tab 30. The outer race tab 28 remains within the actuator plate slot 27. Since the outer race tab 28 is engaged by the actuator plate 22 and the inner race tab 30 is not, the inner race 18 is free to rotate with the frictional torque created by the inner ring 14 rotating against the inner race 18. Rotation of the inner race 18 relative to the outer race 16 causes the rollers 20 to engage the side faces of the ridges 23 such that the rollers 20 wedge causing the inner race 18 to contract the space 19 and engage the inner ring 14, thereby carrying torque. When the force is removed from the actuator pins 26, the return spring 24 attempts to return the actuator plate 22 to the first position. However, the relative rotation of the inner race 18 causes the inner race tab 30 to rotationally misalign with the actuator plate slot 27 such that the actuator plate 22 will be blocked by the inner race tab 30 unless the outer and inner race 16, 18 are rotationally neutral. At the moment of rotational alignment of the outer and inner races 16, 18, the actuator plate 22 will move in the direction opposite that of arrow W with the force of the spring 24, deactivating the clutch 10.

Referring to FIG. 3, outer and inner tabs 28 and 30 have the same circumferential width such that when the actuator plate 22 is in the first position, the tabs 28 and 30 are both engaged in the same manner Alternatively, the first position of the actuator plate 22 can provide a one-way clutch function if the inner race tab 30 is reduced in circumferential width such that the inner race 18 has freedom of rotational movement to allow lock in one direction but is blocked from rotation and thus locking in the opposite direction of rotation.

Figure 4:
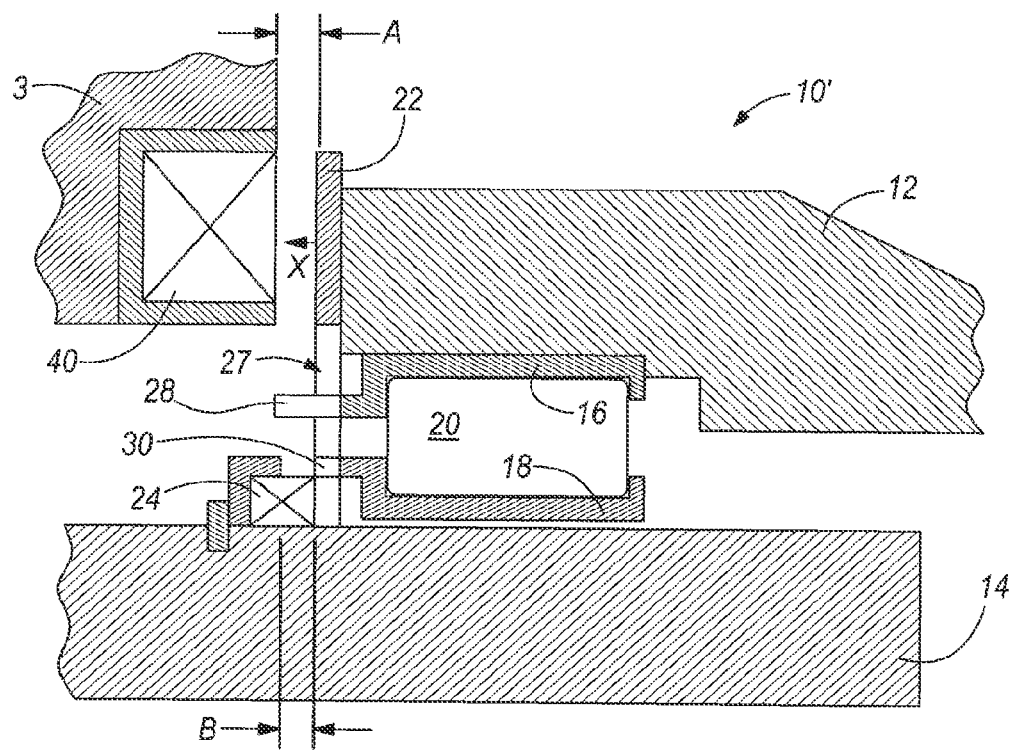
FIG. 4 is a sectional view of a clutching assembly that is a second embodiment of the present invention.

Referring to FIG. 4, a selectable mode clutch 10' that is an alternate embodiment of the present invention is shown. The clutch 10' is substantially the same as that in the previous embodiment and includes an outer ring 12, an inner ring 14, an outer race 16, an inner race 18, rollers 20, an actuator plate 22 and a spring 24. The outer and inner races 16, 18 include axial tabs 28, 30 configured to be received in a radial slot 27 of the actuator plate 22. In the present embodiment, instead of actuator pins, an annular electric coil 40 is fitted into the stationary housing 3. The electric coil 40 is a distance A from the actuator plate 22 and the actuator plate has travel B. When the coil 40 is de-energized and the actuator plate 22 is in the illustrated first position, both tabs 28, 30 are received in the slot 27 and engaged by the actuator plate 22. When the coil 40 is energized, the actuator plate 22 moves in the direction of arrow X such that a small operating gap between the coil and actuator plate occurs (A minus B), avoiding drag. The tab 30 is no longer engaged by the actuator plate 22 and the clutch 10' operates in the manner described with respect to the first embodiment.

With this device, power can be switched from one rotating element to another. This device can be applied to create an 'on-demand' four wheel drive system. This system comprises a front axle and rear axle. The clutch 10' of FIG. 4 is inserted into the driveline of one of the two axles. The axle whose torque is interrupted by the clutch 10' is driven with a higher numerical drive reduction ratio than the other axle. When a significant speed difference across the clutch device is sensed, indicating wheel slip, the coil 40 is activated, causing torque to be transmitted though the clutch and into the secondary axle. After triggering the clutch, the coil 40 is immediately de-energized so that when traction is regained, the ratio difference will cause a torque reversal through the clutch 10', causing the clutch 10' to disengage.

Figure 5:
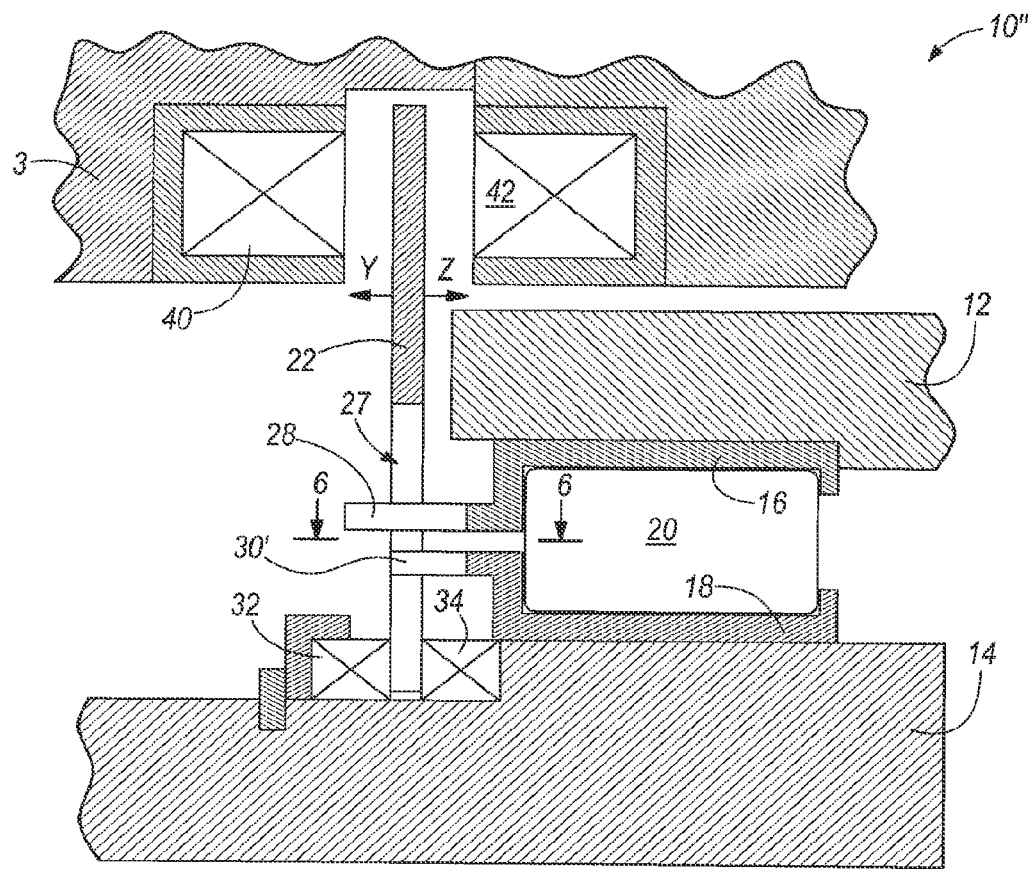
FIG. 5 is a sectional view of a clutching assembly that is a third embodiment of the present invention.
Figure 6:
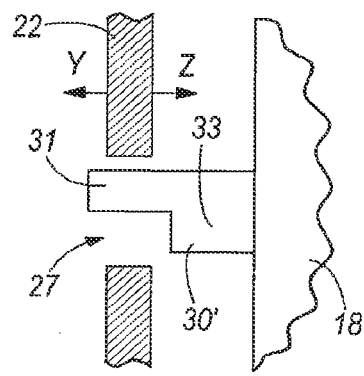
FIG. 6 is a radially inward view taken along the line 6-6 in FIG. 5.

Referring to FIGS. 5 and 6, a selectable mode clutch 10" that is another alternate embodiment of the invention is shown. The clutch 10" is substantially the same as in the previous embodiments and includes an outer ring 12, an inner ring 14, an outer race 16, an inner race 18, rollers 20 and an actuator plate 22. The outer and inner races 16, 18 include axial tabs 28, 30' configured to be received in a radial slot 27 of the actuator plate 22. In the present embodiment, the inner race tab 30' has two circumferential widths, a narrow portion 31 and a wider portion 33, as shown in FIG. 6, and the actuator plate 22 is moveable between three positions. In the center position shown in FIGS. 5 and 6, both tabs 28 and 30' are within the actuator plate slot 27, with the actuator plate 22 aligned with the narrow portion 31 of the tab 30'. As such, freedom of relative rotation is allowed in one direction thus creating a one-way clutch function. Preferably, the actuator plate 22 is biased to the center position by two springs 32, 34, or other biasing means. The springs 32, 34 are preferably such that spring 32 is a high rate spring and spring 34 is a low rate spring.

The actuator plate 22 is moveable in the direction of arrow Y to a position where the actuator plate slot 27 is free of the inner race tab 30' but not the outer race tab 28, similar to the second position in the previous embodiments. In the present embodiment, the actuator plate 22 is moved in the direction Y by energizing an electric coil 40. The actuator plate 22 is also moveable in the direction Z to a position where the actuator slot 27 is aligned with the outer tab 28 and the wider portion 33 of the inner tab 30' such that the actuator plate 22 rotationally aligns the outer and inner races 16, 18 to prevent lock in both directions, similar to the first position in the previous embodiments. In the present embodiment, the actuator plate 22 is moved in the direction Z by energizing an electric coil 42.

The 'on-demand' four wheel drive system previously described with respect to FIG. 4 is similar when using this clutch 10" embodiment except that the one way clutch function provides automatic 'on-demand' torque to the auxiliary axle in forward driving without speed sensors. When the main axle slips, the speed difference across the clutch 10" is reversed, causing it to lock. In good traction conditions, the axle drive ratio difference keeps the clutch 10" from locking. For engine braking in forward drive, the actuator plate is moved in the direction of arrow Y. To prevent locking in reverse drive, the actuator plate is moved in the direction of arrow Z.

While the present invention has been described in use with specific clutching applications, the clutches of the present invention can be utilized in various systems and applications.

Additionally, while in the illustrated embodiments the tabs 28, 30 are integrally formed with the races 16, 18, those skilled in the art will understand that the tabs 28, 30 could be separate components directly attached to the races, or could take other forms and configurations of axial projections that are coupled for rotation with the races 16, 18 in other manners.

What is claimed is:

1. A clutching device comprising:
    an outer race having a radially inward surface having a plurality of axial ridges to define outer race pockets;
    an inner race having a radially outward surface having a plurality of axial ridges to define inner race pockets opposed to the outer race pockets;
    a plurality of rollers positioned between the outer and inner races in the outer and inner race pockets;
    a first axial projection coupled for rotation with one of the inner and outer race, the first axial projection having a narrow portion and a wider portion; and
    an actuator plate coupled for rotation with one of the inner and outer race and axially moveable between a first position wherein the actuator plate is axially aligned with the wider portion of the first axial projection and a second position wherein the actuator plate is axially aligned with the narrow portion of the first axial projection.

2. The clutching device of claim 1 further comprising a second axial projection coupled for rotation with the other one of the inner and outer race, and wherein the actuator plate engages the second axial projection in both the first and second positions.

3. The clutching device of claim 2 wherein the second axial projection is a tab integrally formed with the other one of the inner and outer race.

4. The clutching device of claim 2 wherein the second axial projection is longer in the axial direction than the first axial projection.

5. The clutching device of claim 1 wherein the actuator plate is moveable to a third position in which it does not engage the first axial projection.

6. The clutching device according to claim 1 wherein the actuator plate is biased toward the second position.

7. The clutching device according to claim 6 wherein the actuator plate is biased by a spring.

8. The clutching device according to claim 1 wherein the actuator plate is moved from the first position to the second position by an annular electric coil.

9. The clutching device according to claim 1 wherein the rollers are axially retained between shoulders formed on both the inner and outer races.

10. The clutching device of claim 1 wherein the first axial projection is a tab integrally formed with the one of the inner and outer race.

* * * * *